United States Patent [19]

Iwaki et al.

[11] 4,304,270
[45] Dec. 8, 1981

[54] PROCESS FOR MANUFACTURING OF BATTERY PLATES

[75] Inventors: Tsutomu Iwaki, Yawata; Yoshihiro Kobayashi, Neyagawa, both of Japan

[73] Assignee: Matsushita Electric Industrial Co., Ltd., Oaza, Japan

[21] Appl. No.: 29,996

[22] Filed: Apr. 16, 1979

Related U.S. Application Data

[62] Division of Ser. No. 865,247, Dec. 28, 1977, abandoned.

[30] Foreign Application Priority Data

Jan. 7, 1977 [JP] Japan ............................... 52-927
Jan. 7, 1977 [JP] Japan ............................... 52-928

[51] Int. Cl.³ .......................... B65B 1/04; B65B 3/04
[52] U.S. Cl. ..................................................... 141/1.1
[58] Field of Search ............... 141/1.1, 1, 32, 33; 29/623.1, 623.2, 623.3, 623.4, 623.5; 204/2.1; 252/182.1, 425.3

[56] References Cited

U.S. PATENT DOCUMENTS 2,673,230  3/1954  Brennan .
2,759,039  8/1956  Clark .
2,821,565  1/1958  Lauder et al. .
3,023,261  2/1962  Louis et al. .
3,275,473  9/1966  Barnett et al. .
3,310,438  3/1967  Huffman et al. .
3,472,696  10/1969  Shoeld .
3,711,332  1/1973  Bastacky .
3,862,861  1/1975  McClelland et al. .
3,904,433  9/1975  Fraizier .

*Primary Examiner*—Houston S. Bell, Jr.
*Attorney, Agent, or Firm*—Burgess, Ryan and Wayne

[57] ABSTRACT

Softening and separation of an active material in flat-type pasted positive plates are prevented by a simple process with an inexpensive material so that the life may be comparable with that of clad type positive plates. Finely divided, corrosion inhibitive, thermoplastic resin powder is sprayed or otherwise applied over a pasted positive plate and heated and melted to form thin porous layers over the major surfaces of the positive plate. According to another aspect of the invention, the same resin powder is melted and bonded within the positive plate so that porous layers may be formed within the plate in addition to the porous layers on the major surfaces.

6 Claims, 14 Drawing Figures

PROCESS FOR MANUFACTURING OF BATTERY PLATES

This is a division, of application Ser. No. 865,247, filed Dec. 28, 1977, now abandoned.

BACKGROUND OF THE INVENTION

The present invention relates to lead acid batteries with pasted positive and/or negative plates and a process for manufacture thereof.

The pasted positive plates in the lead acid batteries for stand-by service or in the portable lead acid batteries are divided, based upon the construction, into flat-plate type and clad type. In the clad type, a cylinder of active material is surrounded by an envelope in the form of a slotted tube so that a long life of a lead acid battery with the clad type pasted positive plates is ensured. On the other hand, the flat-plate type pasted positive plates are advantageous because of their simple production process and because of their unique discharge characteristics so that the lead acid batteries with the flat-type positive plates have been widely used for starting the engines of automobiles. Since heavy current is required to start an automobile engine, the batteries for automobiles must have a high output characteristic and at the same time must be inexpensive. Therefore, the batteries for automobiles are limited to the lead acid batteries with the flat-plate type pasted positive plates. Because of the low costs of the lead acid batteries with the flat-type pasted positive plates, they have been widely used for motive-power service, such as electric cars, golf carts, forklifts and so on.

The lead acid batteries with the flat-type pasted positive plates are also widely used as the source of power for television sets and tape recorders. In order to facilitate the handling of these batteries, the containers are totally closed to avoid the spill of an electrolyte or an electrolyte in the form of a gel is used. The flat-plate type lead acid batteries replace the clad-type lead acid batteries in some cases as stationary batteries. The lead acid batteries with flat-plate type pasted positive plates which have been widely used in various fields as described above, have their own problems depending upon their purposes. For instance, the lead acid batteries for starting automotive engines must have an excellent rapid discharge characteristic as well as a long life, and the batteries for driving electric cars must has a high energy density as well as a long life. Furthermore, for any lead acid batteries whatever their uses may be, they must be fabricated by a simple process so that their cost may be low.

A most common process for preparation of flat-plate type pasted positive plates comprises a step of pasting a paste consisting of an active material and diluted sulfuric acids to pockets of a grid made of a lead alloy, a step of drying and a step of forming.

Therefore, the improvements of flat-plate type pasted positive plates are dependent upon the composition of paste, materials and construction of grids, the improvement of the step for pasting the paste to the grids. Briefly stated, the more water and diluted sulfuric acid are added to an active material of lead powder, the higher the efficiency becomes, but the shorter the life becomes.

As the materials for grids, the quantity of antimony in an lead-antimony alloy is reduced in order to minimize the self-discharge and to facilitate the maintenance. Furthermore lead alloyed with calcium instead of antimony is used, and some lead acid batteries with the flat-plate type pasted positive plates made of a lead-calcium alloy have been already available in the market.

As to the bonding of the paste to the grids made of such a lead-calcium alloy, it has been experimentally confirmed that the bonding strength is not sufficient and must be improved.

As to the energy storage density, the grid serves not only for holding the paste in its pockets but also for conducting a current. Although the grid is not directly involved in the electrochemical reaction, it occupies a considerable part of the weight of the battery, which is one of the disadvantages of the grids. From the standpoint of productivity, one grid is used for one positive plate so that the grid type pasted positive plates are not adapted for the continuous mass production. In order to attain continuous mass production, the expanded metal type plates which are widely used in the alkaline storage batteries have been tried. The inexpensive lead acid batteries will be widely and mainly used for years for motive-power service such as electric cars, but they have their inherent problems in that the energy storage density is low and the life is short. In order to solve these problems, extensive studies and experiments have been conducted in various fields.

In order to improve the energy storage density, first the efficiency of an active material must be improved and the voltage must be increased, but these improvements are limited. When the efficiency is improved, the battery characteristics are improved in the initial service stage, but the life becomes shorter. Another countermeasure is to increase the ratio of the volume of an active material to the volume of a pasted positive plate; that is, to provide grids which are light in weight and small in size.

To this end, expanded metal, metal meshes and perforated metal sheets may be advantageously used, but the reduction in ratio of the volume of a support to the volume of a pasted positive plate is not preferable because the life is adversely affected. In other words, in order to improve the life, the support must contain the active material in a three-dimensional manner. However, the grids capable of this are very complex in construction and the ratio of the volume of the grid to the overall volume of the positive plate is increased. As a result, such grids are not preferable from the standpoint of the improvement of the energy storage density.

The flat-plate type pasted positive plates may be fabricated in a relatively simple process and have good discharge characteristics. However, even with the improved active materials and the improved materials and constructions of grids, there arises another serious problem of the increased separation of the active material from the plate due to the repetitive cycles of discharge and charging with an increased difference between a discharged voltage and a charged voltage. As a consequence, the life in terms of the number of cycles of discharge and charging is still short.

As is well known in the art, at a positive plate, lead dioxide $PbO_2$ is converted to lead sulfate while at a negative plate lead is converted into lead sulfate, on discharge. Since diluted sulfuric acid is directly involved in the chemical reactions, it must be sufficiently diffused into the plates on discharge. In view of this fact, the idea of forming a thin resin layer on the plate has been rejected because the resin layer prevents sufficient diffusion of diluted sulfuric acid into the plates so that the discharge reaction is retarded even though the resin layer will be effective for preventing the separation of the active material from the plates.

SUMMARY OF THE INVENTION

Accordingly, one of the objects of the present invention is to provide a lead acid battery wherein porous resin layers are formed on the pasted positive and/or negative plates so that the separation of the active material from the plates may be prevented by the increase in bonding strength of the active material to the plates.

Another object of the present invention is to provide a lead acid battery wherein porous flat-plates are used as supports so that the discharge capacity may be considerably improved.

A further object of the present invention is to provide a cylindrical lead acid battery wherein porous thermoplastic layers are formed on the positive and negative plates to increase their mechanical strength to such an extent that even when they are coiled, their fractures and crackings may be prevented and consequently the separation of the active material from the plates may be prevented.

A further object of the present invention is to provide a lead acid battery wherein thin porous thermoplastic resin layers are formed on the surfaces of both positive and negative plates and an electrolyte in the form of a gel is used so that the separator may be eliminated, the short-circuit may be prevented and the life may be improved.

A still further object of the present invention is to provide a process for manufacture of lead acid batteries wherein porous thin resin layers are formed on the surfaces of the positive and/or negative plates in a simple step so that the separation of the active material from the plates may be prevented.

Briefly stated, to the above and other ends, the present invention provides a lead acid battery comprising positive and negative plates each consisting of a support and a paste-like active material applied thereon, an electrolyte and a porous layer of a corrosion-inhibitive, thermoplastic resin melted and welded to the major surface of each of at least said positive or negative plates. The present invention further provides a process for manufacture of lead acid batteries of the type described above including the steps of applying a paste-like active material to a support, applying over and bonding to said paste-like active material on the support finely divided, corrosion-inhibitive, thermoplastic resin powder, and heating and melting said resin powder at a temperature in excess of its melting point.

DESCRIPTION OF THE PREFERRED EMBODIMENTS

Example 1

Figure 1:
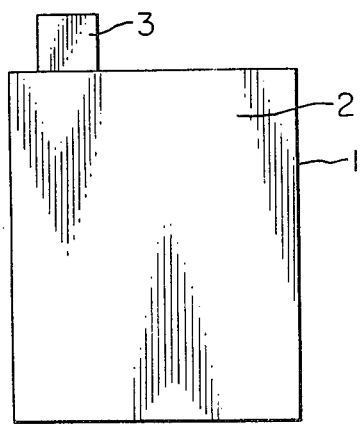
FIG. 1 is a schematic side view of a pasted positive plate in accordance with the present invention.
Figure 2:
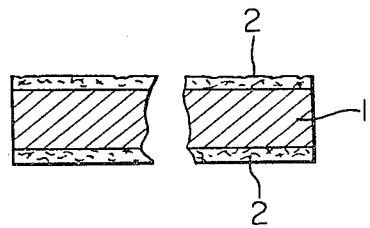
FIG. 2 is a schematic sectional view thereof.

Referring to FIGS. 1 and 2, a support consists of a rectangular grid of lead alloyed with antimony (2.5% by weight) and is 75 mm in length, 50 mm in width and 1.5 mm in thickness. A paste consisting of an active material of lead powder (1000 g), water (130 ml) and sulfuric acid (70 ml with the density of 1.35) is pasted into pockets of the grid, formed and dried. A pasted positive plate is obtained which is substantially similar in composition to the conventional pasted positive plates for batteries for automobiles. This pasted positive plate has the capacity of about 0.8 Ah for ten hours. The pasted positive plate is supported horizontally, and a solution consisting of finely divided polyethylene (average particle size: 50 microns, melting point 120° C.) dispersed in ethyl alcohol is sprayed uniformly over the surfaces of the pasted positive plate and heat-treated at 130° C. for 0.5 hours so that the polyethylene powders are rigidly bonded to the surfaces of the positive plate.

Pasted positive plates with polyethylene powder deposited at the rates of 1, 2.5, 5, 7.5 and 10 mg per square centimeter (1 $cm^2$) of the apparent surfaces of the positive plates are designated by A, B, C, D and E, respectively, and the pasted positive plate provided with no porous layer of polyethylene powder is designated by F.

Figure 10:
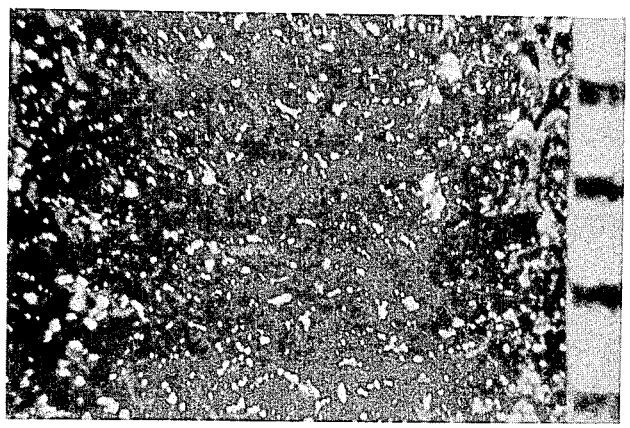
FIGS. 10 and 11 are microphotos showing the surface conditions of the positive plates prepared in accordance with EXAMPLES 1 and 2, respectively.

In FIGS. 1 and 2 there is shown the pasted positive plate thus provided. 1 denotes the main body of the pasted positive plate; 2, the porous layer of polyethylene bonded to each of the major surfaces of the positive plate 1 in the manner described above; and 3, a lead. FIG. 10 is a microscopic photo ($\times 10$) of a pasted positive plate prepared with a polyethylene powder deposition rate of 3 $mg/cm^2$.

Five pasted positive plates of each of A-F and six pasted negative plates with a discharge capacity substantially equal to that of the positive plates are interleaved with separators (made of cellulose about 1 mm in thickness) interposed therebetween, whereby a single cell is constructed. An electrolyte, that is, diluted sulfuric acid is adjusted to 1.28 in specific weight when charging is completed.

Figure 3:
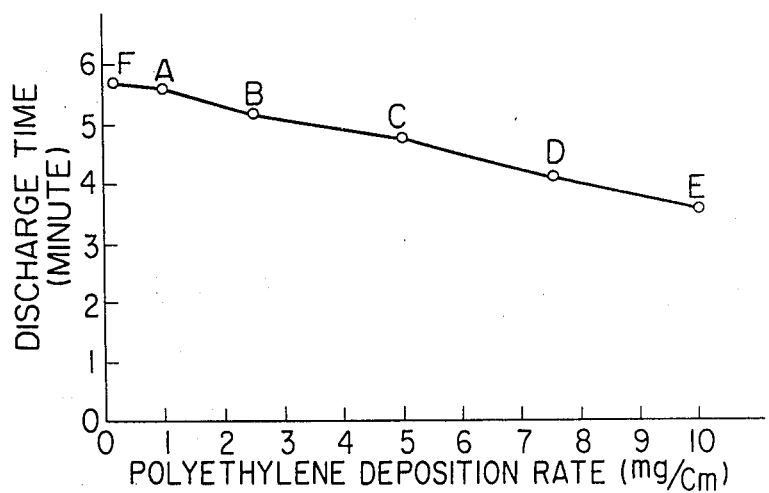
FIG. 3 shows the relationship between the polyethylene deposition rate ($mg/cm^2$) and the discharge time in minutes, lead acid batteries of EXAMPLE 1.

FIG. 3 shows the continuous discharge hours of the cells constructed in the manner described above when discharged at the rate of 20 A at room temperature until the limiting voltage of 1.2 V is reached. As described above, the polyethylene deposition rates are 1, 2.5, 5, 7.5, 10 and 0 mg/cm$^2$.

Figure 4:
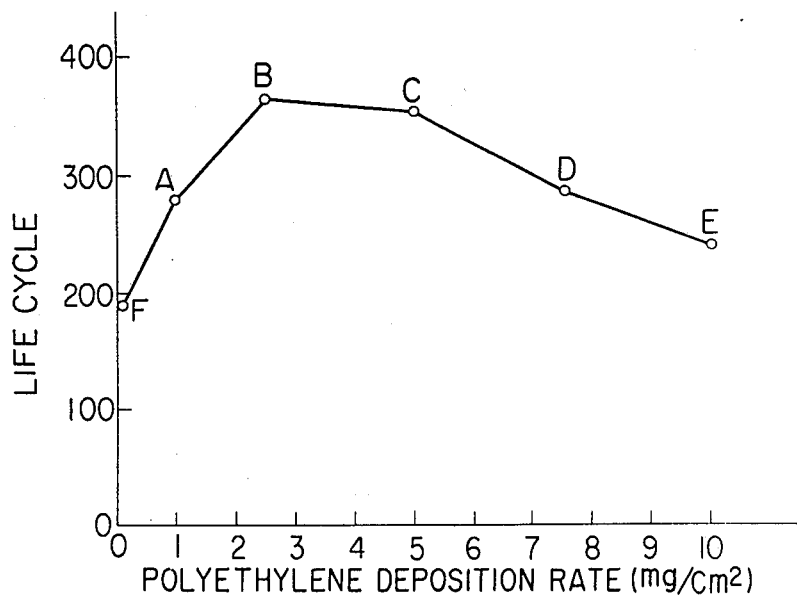
FIG. 4 shows the relationship between the polyethylene deposition rate and the life in terms of the number of cycles of discharge and charging of the lead acid batteries of EXAMPLE 1.

The lives of these cells are subjected to repetitive discharge-charging tests in such a way that the discharge is continued for three hours at 0.8 A and then the charging is continued for four hours at 0.4 A. FIG. 4 shows the results (that is, the number of cycles until the terminal voltage becomes 1.7 V after the discharge of three hours).

It is seen that in case of the discharge at such a high rate as 20 A, the higher the polyethylene powder deposition rate, the shorter the continuous discharge capacity becomes. It is confirmed that there exists an optimum polyethylene deposition rate for a maximum life as shown in FIG. 4. An explanation for this phenomenon is that a small polyethylene deposition rate provides a low resistance during the discharge, but does not prevent softening and separation of the active material. A high polyethylene powder deposition rate contribute to high resistance during the discharge and covers more active materials preventing them from undergoing the required chemical reaction.

EXAMPLE 2

Figure 11:
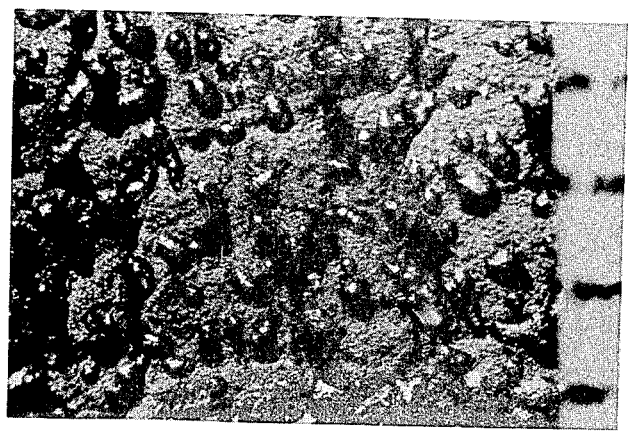

A support consists of a rectangular grid made of lead alloyed with antimony (2.5% by weight) and 75 mm in length, 50 mm in width and 3.0 mm in thickness. A paste consisting of finely divided lead active material (1000 g), water (140 ml) and sulfuric acid (60 ml with a specific weight of 1.35) is pasted into pockets of the grid, formed and dried, whereby a pasted plate similar in composition to the positive plates for use in batteries intended for a long service life is obtained. The positive plate has a discharge capacity of about 1.5 Ah for 10 hours. Following the procedures of EXAMPLE 1, finely divided polyethylene powder (average particle size: 15 microns, with a melting point: 115° C.) is sprayed over the major surfaces of the plate and heat-treated for 20 minutes at 130° C. so that the polyethylene powder was rigidly bonded to the plate. The pasted positive plates thus prepared with the polyethylene powder deposition rates of 1, 2.5, 5, 7.5, 10 and 12.5 mg/cm$^2$ are designated by A, B, C, D, E and F, respectively, while the pasted positive plate provided with no porous layer of polyethylene is denoted by G. Five pasted positive plates of each of A-G and six negative plates having the discharge capacity corresponding to that of the positive plates are interleaved with separators (made of cellulose and 1.2 mm in thickness) interposed therebetween, whereby a single cell is obtained. The specific weight of an electrolyte; that is, diluted sulfuric acid is adjusted to 1.28 when the charging is completed. FIG. 11 is a microphoto ($\times$18) of the pasted positive plate with the polyethylene powder deposition rate of 1.5 mg.

Figure 5:
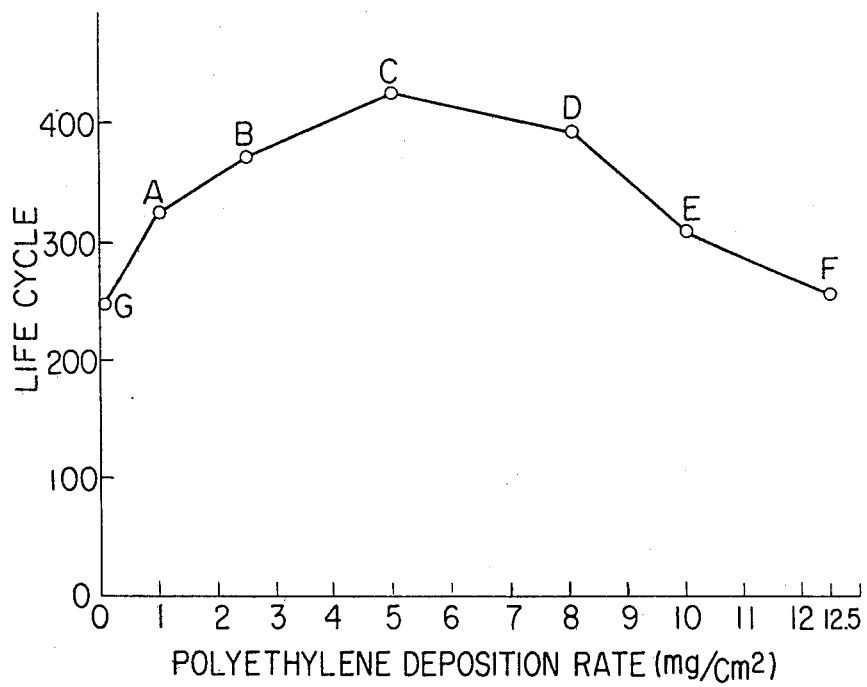
FIG. 5 shows the relationship between the polyethylene deposition rate and the life of each of the lead acid batteries prepared in accordance with EXAMPLE 2.

The cells thus constructed are subjected to repetitive discharge-charging tests for 12 hours in such a manner that the discharge is continued with a discharge current of 1.5 A (that is, until the terminal voltage becomes 1.7 V) and then the charging is continued at the charging voltage of 2.5 V (the maximum current being 5 A). FIG. 5 shows the lives or cycles (until the discharge capacity becomes 60% of the discharge capacity of the positive plate).

In FIG. 5, the polyethylene powder deposition rates of 1, 2.5, 5, 7.5, 10, 12.5 and 0 mg/cm$^2$ correspond to the pasted positive plates A, B, C, D, E, F and G described elsewhere.

In EXAMPLE 1, the discharge is effected for a long time at a low current as compared with EXAMPLE 1. It is seen that when the polyethylene powder deposition rate is too high or too low, it does not contribute to the improvement of service life. Thus, it is very important to select the polyethylene powder deposition rate depending upon the purposes of batteries.

So far, polyethylene powder has been described as being sprayed over the surfaces of the pasted positive plate after the paste has been dried and sufficiently hardened, but polyethylene powder may be sprayed over the surfaces of the pasted positive plate even before the paste has been hardened, and heat-treated at a temperature, for instance 130° C., higher than the melting point of polyethylene after polyethylene powder is pressed lightly (this step being eliminated). Then when the paste active material is hardened, polyethylene powder is melted and then hardened on the surfaces of the active material in the form of nets. It is preferable to press lightly polyethylene powder against the paste as described above because the bonding to the paste of polyethylene powder may be greatly facilitated.

In EXAMPLES 1 and 2, polyethylene powder is used, but it is understood that any other suitable thermoplastic resins may be used. For instance, polypropylene may be used. In this case, the deposition rate is similar to that of polyethylene but the heat-treatment temperature is slightly increased to 160° to 180° because of the high softening point. The characteristics obtained are substantially similar to those attainable with polyethylene. When polystyrene or polyvinylchloride is used, the deposition rates is about $\frac{2}{3}$ of that of polyethylene, and the heat-treatment temperature is 110° to 130° C. because of the low melting point and high flowability. In like manner, the deposition rate and heat-treatment temperature may be suitably selected depending upon the melting point, flowability and ability of diffusing into the pasted positive plates of the thermoplastic resin used.

In both EXAMPLES 1 and 2, polyethylene powder is sprayed over the surfaces of the positive plate and heated and melted to form the porous layer. Furthermore, a resin layer may be formed within the pasted positive plate in order to improve the life as will be described below.

EXAMPLE 3

A pasted positive plate is 80 mm in length, 50 mm in width and 1.5 mm in thickness and has the discharge capacity of 1.5 Ah for about ten hours.

Polyethylene powder (particle size: about 30 microns and a melting point: about 120° C.) is dispersed in methyl alcohol and sprayed over the major surface of the positive plate at the deposition rate of about 4 mg per cm$^2$ of the apparent surface. Thereafter, the positive plate is dried to remove alcohol, and then heated at 140° C. for 20 minutes to melt polyethylene powder, thereby forming a thin resin layer of very fine pores. Next, the positive plate is immersed into a dispersion consisting of finely divided polyethylene powder (average particle size: 15 microns and melting point: about 120° C.) dispersed at the ratio of 3% by weight into water, and withdrawn and dried at 140° C. for 0.5 hours. The pasted positive plates thus prepared are referred to as "A". Three positive plates A and four conventional pasted negative plates are interleaved with a separator (made of cellulose and 1 mm in thickness) interposed therebetween, whereby a cell is constructed. An electrolyte is injected into a container, and the cell is charged and formed. The specific weight of the electrolyte which is diluted sulfuric acid is adjusted to 1.28 at the end of charging.

For the sake of comparison, single cells are constructed with the pasted positive plates B not subjected to the above polyethylene deposition and dispersion, the pasted positive plates C subjected to the polyethylene deposition and the pasted positive plates D subjected only to the polyethylene dispersion.

Figure 6:
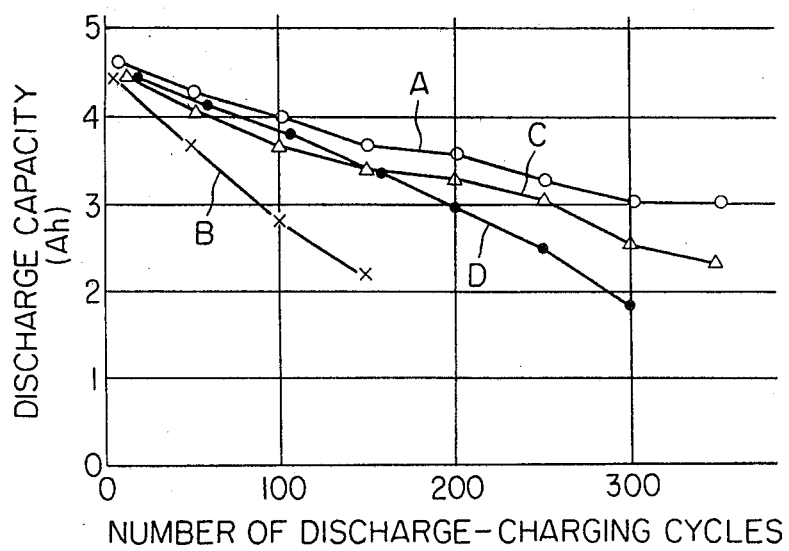
FIG. 6 shows the relationship between the discharge in ampere-hour and the number of discharge-charging cycles of lead acid batteries prepared in accordance with EXAMPLE 3.

The single cells A-D are subjected to the repetitive discharge-charging tests in such a way that each cell is discharged at a rate of 1 A until the terminal voltage drops to 1.8 V and then is continuously charged for 10 hours with the maximum charging current of 5 A until the terminal voltage rises to 2.5 V. The results are shown in FIG. 6.

It is seen that as compared with other cells the cell A of EXAMPLE 3 shows a low decrease in discharge capacity. An explanation to this effect is that because of the fine porous layer of resin distributed at a high density over the major surfaces of the positive plate, the separation of active materials which are finely divided within the positive plate may be prevented from being separated from the positive plate; because of the meshlike structure of finely divided resin powder which has penetrated relatively deeply into the positive plate, softening of the active material within the positive plate is favourably suppressed; and the synergistic effect of these two phenomena may be attained.

So far the present invention has been described in conjunction with the preparation of the pasted positive plates, but it will be understood that the present invention may be equally applied to the pasted negative plates in order to avoid the softening and separation of the active material and to improve the service life.

Instead of the steps of EXAMPLE 3 for first forming a fine porous layer and then immersing the positive plate into the dispersion containing finely divided resin powder, the plate may be first immersed in the dispersion, and then the fine porous layer of the same resin may be formed. However, finely divided resin powder diffused into the plate by the dispersion step is heated and melted to form a relatively smooth thin layer over the relatively rough major surfaces of the plate. As a result, finely divided resin powder cannot be attached sufficiently so that the fine porous layer sufficient for preventing the separation of the active material cannot be formed.

The average particle size of finely divided resin powder diffused in the dispersion or emulsion which is selected is smaller than the average particle size of finely divided resin sprayed over the major surfaces of the positive or negative plate because the former resin powder may penetrate into the plate through the finely porous resin layers formed over the major surfaces of the plate. When the average particle size of the resin in the dispersion or emulsion is greater, the resin powder cannot penetrate through the porous resin layers into the plate.

Instead of the steps of EXAMPLE 3, finely divided resin powder may be mixed with the paste, and after the paste has been pasted, the finely divided resin powder may be sprayed over the major surfaces of the plate and heat-treated to form the porous resin layers. These steps may avoid the problems caused by the steps of impregnating the plate into the dispersion or emulsion and then forming the porous resin layers.

In order to attain nonspillability and to facilitate handling, an electrolyte in the form of a gel has been used in small-sized batteries. The present invention may be equally applied to these batteries as will be described below.

EXAMPLE 4

Conventional pasted positive plates A 80 mm in length, 30 mm in width and 2.5 mm in thickness and conventional pasted negative plates B 80 mm in length, 30 mm in width and 2.0 mm in thickness are used. Both the positive and negative plates A and B are immersed in water so as to be moistened. Next polyethylene powder (melting point: 120° C. and particle size: smaller than 100 mesh) is sprayed over the major surfaces of the positive and negative plates A and B. The plates A and B are suspended vertically and heat-treated at 140° C. for 20 minutes to fuse and attach finely divided polyethylene powder to the positive and negative plates A and B at the rate of about 3 mg/cm$^2$ of the apparent surfaces thereof.

Two positive plates A and three negative plates thus prepared are interleaved with spacers so that the positive and negative plates may be spaced apart from each other by approximately 1.5 mm. The plate assembly is then placed in a container, and a mixture consisting of sulfuric acid (40% by weight) and silicic acid (15% by weight) is mixed well and poured into the container above the upper edges of the positive and negative plates A and B, whereby the mixture is gelled. The constructed cell is referred to as "a".

Figure 7:
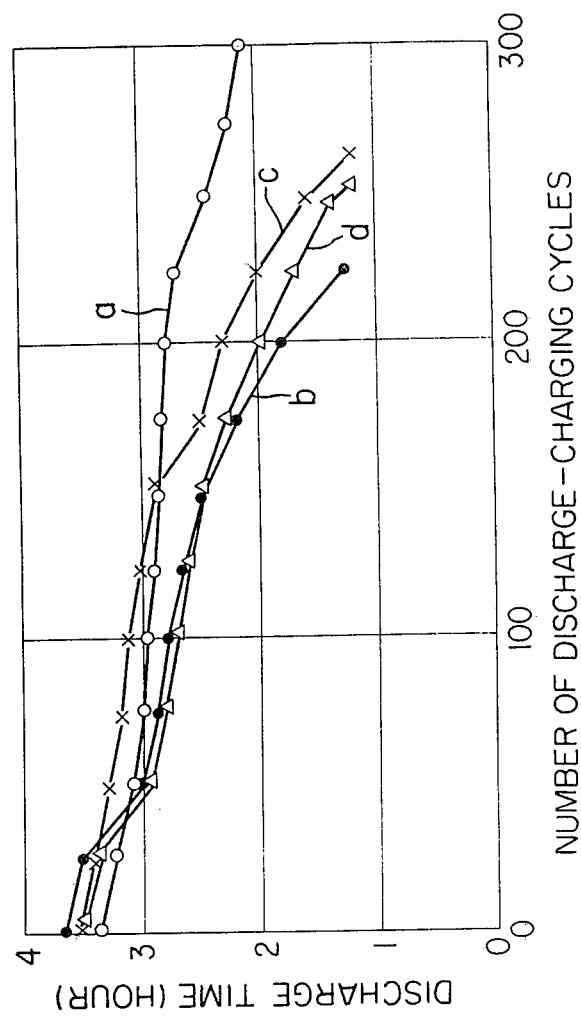
FIG. 7 shows the relationship between the discharge time and the number of discharge-charging cycles of lead acid batteries prepared in accordance with EXAMPLE 4.
Figure 8A:
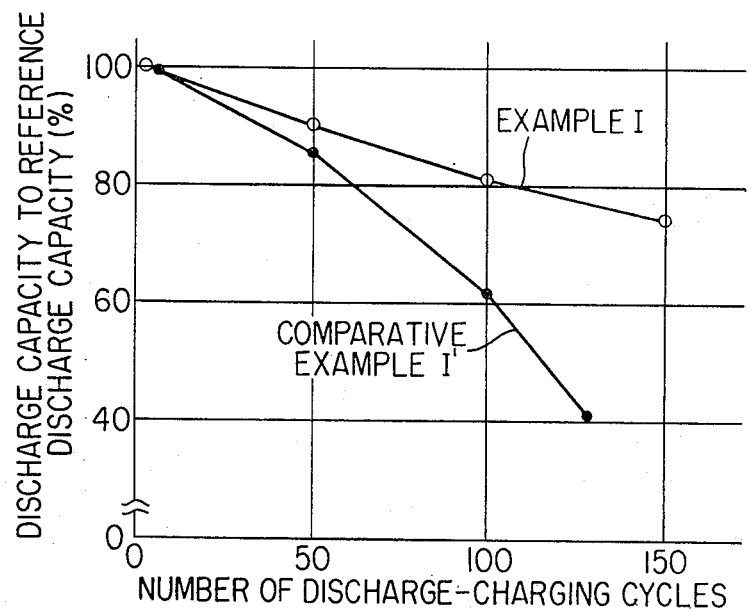
FIGS. 8A, B, C and D each show the relationship between the discharge capacity in % based on the reference discharge capacity and the number of discharge-charging cycles of each of the lead acid batteries prepared in accordance with EXAMPLE 5, the porosity of the support of the battery shown in FIG. 8A being 75%, the porosity of the support of the battery shown in FIG. 8B being 65%, the porosity of the supports of the battery shown in FIG. 8C being 50% and the porosity of the supports of the battery shown in FIG. 8D being 40%.
Figure 8B:
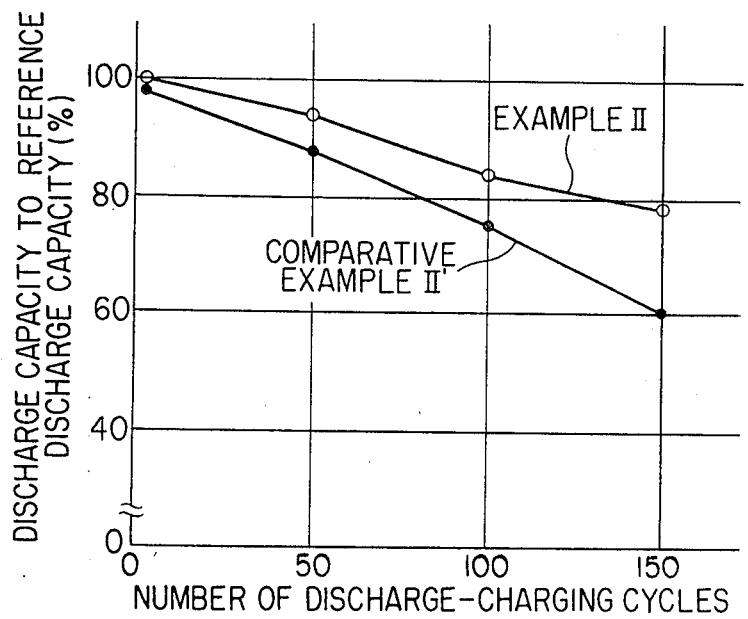
Figure 8C:
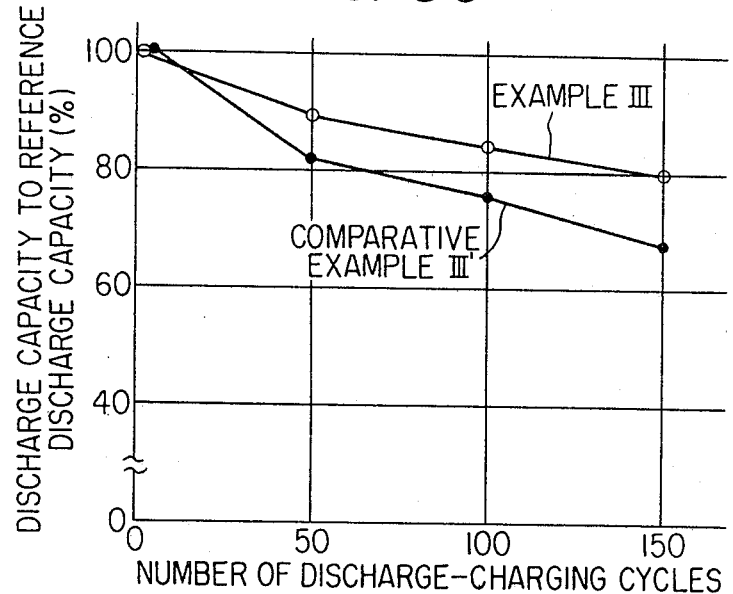
Figure 8D:
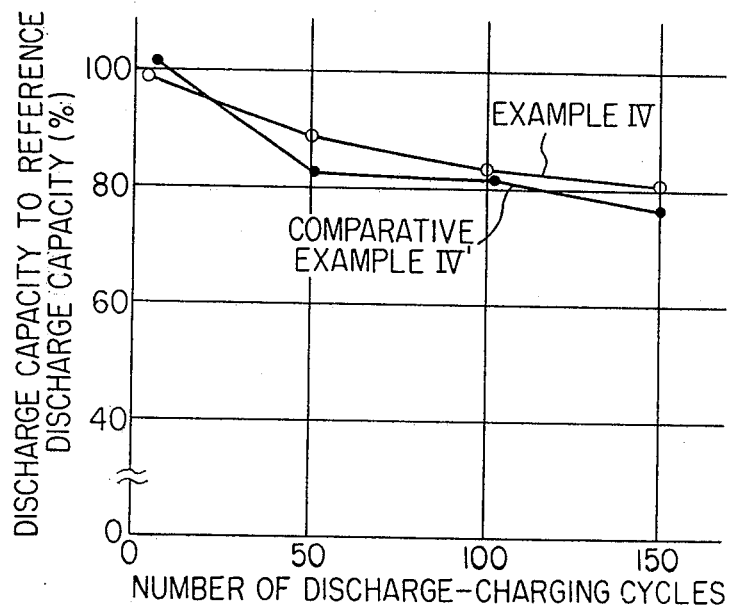

For the sake of comparison with two positive plates and three negative plates not subjected to the polyethylene treatment, a cell b is constructed. With three positive plates subjected to the polyethylene treatment and three negative plates not subjected to the polyethylene treatment, a cell c is constructed. With two positive plates not subjected to the polyethylene treatment and three negative plates subjected to the above polyethylene treatment, a cell d is constructed. Three of these cells (of the same type) are combined to produce a battery. These batteries are subjected to the repetitive discharge-charging tests in such a way that each battery is discharged through a fixed resistor load of 7 ohms until the terminal voltage drops to 1.7 V and then charged for ten hours with the maximum charging current of 1 A until the terminal voltage rises to 7.5 V. The results are shown in FIG. 7.

It is seen that the lives of the batteries c and d are longer than that of the battery b and that the life of battery a is by far longer. The discharge capacity of the battery a is lower than those of the batteries b-d when the number of cycles of discharge and charging is less, but the decrease in discharge capacity is lower as compared to the batteries b-d and the life in terms of cycles of discharge and charging is by far longer. An explanation is that the thin porous polyethylene layers on the positive and negative plates supress the softening and separation of the active materials within the plates so that the decrease in discharge capacity due to cyclic discharge and chargings is less. This is apparent from the comparison with the batteries c and d wherein only positive or negative plates are subjected to the polyethylene treatment and with battery b where neither of the positive and negative plates were subjected to the polyethylene treatment.

The existence of gels between the positive and negative plates is very effective for firmly holding the positive and negative plates and for preventing a short circuit. That is, the gels between the positive and negative plates serve as the separators so that no separator is required.

As described above, the lead acid battery of EXAMPLE 4 in accordance with the present invention comprises pasted positive and negative plates each having their major surfaces coated with thin porous layers of a thermoplastic resin and a gelled electrolyte which also serves as separators. Therefore, the life in terms of cycles of discharge and charging may be considerably improved as described above.

When the so-called porous plates such as expanded sheets, perforated sheets and screens all made of lead alloyed with a small quantity of antimony are used instead of supporting grids, the ratio of the volume of the supporting member to the volume of the positive or negative plate may be reduced so that the discharge capacity may be improved and the step for applying the paste to the plates is adapted for the mass production of batteries.

EXAMPLE 5

Rectangular pasted positive plates 50 mm in width, 75 mm in height and 1.0 mm in thickness and so formed as to have a discharge capacity of approximately 1 Ah for ten hours are prepared. The supports are expanded lead metal sheets 0.5 mm in thickness with a porosity of 75, 65, 50 and 40%. The plates are moistened with water, and polyethylene powder (average particle size: about 30 microns and a melting point: about 128° C.) is sprayed uniformly over the major surfaces of the plates at a rate of 0.3 g per plate. Thereafter, the plates are heated at 145° C. for a quarter hour and then cooled to room temperature.

With three pasted positive plates thus prepared, four pasted negative plates 50 mm in width, 75 mm in height and 1.0 mm in thickness and with a discharge capacity of approximately 1.0 Ah for ten hours, positive plate separators approximately 1 mm in thickness and made of glass mat and negative plate separators approximately 0.6 mm in thickness and made of cellulose, a single battery is constructed. The specific weight of an electrolyte, that is, diluted sulfuric acid is adjusted to 1.2% at the end of the charging.

These batteries are subjected to repetitive discharge-charging tests in such a way that each battery is discharged continuously at a rate of 0.6 A until the terminal voltage drops to 1.7 V and then a conventional paste consisting of a finely divided lead compound and diluted sulfuric acid is applied to the supports followed by drying, forming, washing with water and drying. The thus prepared pasted positive plates are 40 mm in width, 120 mm in length and 1.2 mm in thickness and have a discharge capacity of about 2 Ah for 10 hours. Polyethylene powder (average particle size: approximately 10 microns and a melting point: approximately 126° C.) is uniformly diffused into methyl alcohol and sprayed over the major surfaces of the positive plates. Thereafter, the pasted positive plates are heated at 145° C. for 25 minutes. The polyethylene deposition rate is approximately 2 mg/cm$^2$ of the apparent surfaces of the plates.

Next, the preparation and treatment of the negative plates will be described. Following the procedures of the preparation of positive plates, the supports are prepared, and a conventional paste consisting of a finely divided lead compound and diluted sulfuric acid is applied, dried, formed, washed with water and dried. The thus prepared negative plates are 120 mm in length, 40 mm in width and 1.1 mm in thickness and have a discharge capacity of approximately 3 Ah for 10 hours. Finely polyethylene powder (average particle size: approximately 30 microns and a melting point: approximately 126° C.) is sprayed over the major surfaces of the pasted negative plates and heat-treated at 145° C. for 0.5 hours. Prior to spraying the polyethylene powder, the pasted negative plates are moistened with water, and the deposition rate is 4 mg/cm$^2$ of the apparent surfaces of the plates.

The positive and negative plates thus prepared are overlayed one upon another with a separator interposed therebetween, the separator being 0.2 mm in thickness and made of nonwoven cloth of polypropylene, and they are coiled into the form of a cylinder approximately 25 mm in outer diameter and 40 mm in height. The coil thus prepared is inserted into a container substantially similar in outer dimension to a single-cell dry-cell, and the specific weight of an electrolyte which is diluted sulfuric acid is adjusted to 1.28 at the end of charging.

Figure 9:
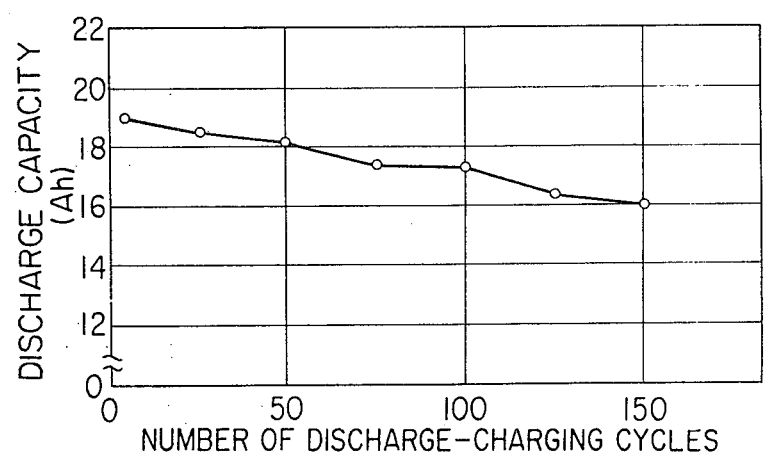
FIG. 9 shows the relationship between the discharge in ampere-hour and the number of discharge-charging cycles of a lead acid battery prepared in accordance with EXAMPLE 6.

The thus constructed battery is subjected to the repetitive discharge-charging test in such a way that the battery is continuously discharged at a rate of 400 mA until the terminal voltage drops to 1.7 V and then continuously charged at 2.5 V (with the maximum charging current less than 0.7 V). The result is shown in FIG. 9. It is seen that according to the present invetion, the improved characteristics of batteries may be maintained even when the pasted positive and negative plates are coiled with the separator interposed therebetween.

For the sake of comparison, the pasted positive and negative plates not subjected to the polyethylene treatment described above are coiled, but fractures, separation and crackings of active materials occur even before the pasted positive and negative plates are completely coiled. The discharge capacity in the initial stage is 1.2 Ah. As a consequence, the repetitive discharge-charging test was not conducted.

As described above, the pasted positive and negative plates may be coiled simultaneously, but it will be understood that the positive and negative plates may be coiled independently of each other and then assembled. Thus, according to the present invention, there may be provided batteries with coiled positive and negative plates which have been so far unattainable by any prior art methods.

What is claimed is:

1. A process for manufacture of pasted positive and negative plates for lead acid batteries comprising the steps of
    applying a paste-like active material to a support,
    applying an adhering finely divided, corrosion-inhibitive thermoplastic resin powder over said paste-like active material, and
    heating said corrosion-inhibitive, thermoplastic resin at a temperature in excess of its melting point.

2. A process as set forth in claim 1 wherein said finely divided, corrosion-inhibitive, thermoplastic resin is sprayed over said paste-like active material which has not been completely dried or hardened, and said thermoplastic resin is melted simultaneously when said paste-like active material is heated and dried.

3. A process as set forth in claim 1 wherein finely divided, corrosion-inhibitive, thermoplastic resin powder is mixed with said paste-like active material before the paste-like active material is applied to the supports.

4. A process for manufacture of pasted positive and negative plates for lead acid storage batteries comprising:
 (a) applying a paste-like active material to a support to form a supported active material;
 (b) applying and adhering to the surface of said supported active material a first finely divided corrosion inhibitive thermoplastic resin powder;
 (c) heating said first finely divided, corrosion inhibitive, thermoplastic resin powder to a temperature above its melting point to form a porous layer having a mesh like structure;
 (d) impregnating said supported active material with a second finely divided, corrosion-inhibitive thermoplastic resin powder, having a particle size smaller than said first finely divided, corrosion inhibitive thermoplastic resin powder, through the pores of the porous layer of thermoplastic resin; and
 (e) heating said second finely divided, corrosion-inhibitive, thermoplastic resin powder impregnated in the supportive active material to a temperature above its melting point.

5. A process as set forth in claim 4 wherein said second finely divided, corrosion-inhibitive, thermoplastic resin powder is dispersed in water and then impregnated into said active material.

6. A process as set forth in claim 4 wherein said finely divided, corrosion-inhibitive, thermoplastic resin powder is suspended in water and then impregnated into said active material.

* * * * *

UNITED STATES PATENT AND TRADEMARK OFFICE
CERTIFICATE OF CORRECTION

PATENT NO. : 4,304,270
DATED : December 8, 1981
INVENTOR(S) : Tsutomu Iwaki et al.

It is certified that error appears in the above-identified patent and that said Letters Patent is hereby corrected as shown below:

ON THE TITLE PAGE, item (30) insert the following,

-- Jan. 7, 1977 (JP)     Japan..........52-929

June 20, 1977 (JP)    Japan..........52-73605

June 20, 1977 (JP)    Japan..........52-73618

June 30, 1977 (JP)    Japan..........52-78743

July 18, 1977 (JP)    Japan..........52-86381     --.

Signed and Sealed this

First Day of February 1983

[SEAL]

*Attest:*

GERALD J. MOSSINGHOFF

*Attesting Officer*     *Commissioner of Patents and Trademarks*